United States Patent
Stellbrink et al.

(10) Patent No.: US 10,124,598 B2
(45) Date of Patent: Nov. 13, 2018

(54) PRINT SATURATION CALIBRATION

(71) Applicant: Hewlett-Packard Development Company, L.P., Houston, TX (US)

(72) Inventors: Joe W. Stellbrink, Corvallis, OR (US); Ron Burns, San Diego, CA (US); Whitney E. Smith, Corvallis, OR (US); April E. Sullivan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/569,307

(22) PCT Filed: Jun. 26, 2015

(86) PCT No.: PCT/US2015/037955
§ 371 (c)(1),
(2) Date: Oct. 25, 2017

(87) PCT Pub. No.: WO2016/209258
PCT Pub. Date: Dec. 29, 2016

(65) Prior Publication Data
US 2018/0117926 A1    May 3, 2018

(51) Int. Cl.
*G06K 15/02*       (2006.01)
*B41J 2/21*        (2006.01)
(Continued)

(52) U.S. Cl.
CPC ......... *B41J 2/2103* (2013.01); *B41J 2/04508* (2013.01); *B41J 2/04586* (2013.01);
(Continued)

(58) Field of Classification Search
CPC .... B41J 29/393; B41J 2/2132; B41J 2/04508; H04N 1/6033; H04N 1/40; G06K 15/02; G06K 15/027
See application file for complete search history.

(56) References Cited

U.S. PATENT DOCUMENTS 6,361,139 B1    3/2002 Gomez et al.
6,494,557 B1   12/2002 Kato et al.
(Continued)

FOREIGN PATENT DOCUMENTS

JP    2005271353 A  * 10/2005
JP    2007196529       8/2007

OTHER PUBLICATIONS

Canon PRO-100 Review First Look & Getting Started, Apr. 9, 2015, Available online at: < http://www.redrivercatalog.com/infocenter/articles/canon-pro-100-review-introduction-first-look-getting-started.html >.

*Primary Examiner* — Sharon A Polk
(74) *Attorney, Agent, or Firm* — HP Inc. Patent Department

(57) ABSTRACT

Examples include computing devices, processes, and/or machine-readable storage mediums comprising instructions to analyze at least one digital image corresponding to calibration output of a printing device to determine location saturation values for nozzle locations of the printing device. At least one printhead is segmented into segments corresponding to one or more nozzle locations. A reference segment is determined from among the segments of the printhead, and a uniformity correction value is determined for at least one segment based at least in part on the reference segment.

15 Claims, 15 Drawing Sheets

(51) Int. Cl.
*B41J 2/045* (2006.01)
*B41J 29/393* (2006.01)
*H04N 1/60* (2006.01)
*H04N 1/40* (2006.01)

(52) U.S. Cl.
CPC ........... *B41J 2/2132* (2013.01); *B41J 29/393* (2013.01); *G06K 15/02* (2013.01); *G06K 15/027* (2013.01); *H04N 1/40* (2013.01); *H04N 1/6033* (2013.01)

(56) References Cited

U.S. PATENT DOCUMENTS

| | | |
|---|---|---|
| 7,006,251 B2 | 2/2006 | Fujino |
| 7,251,058 B2 | 7/2007 | Pop |
| 8,331,665 B2 | 12/2012 | Cordes et al. |
| 8,610,977 B2 | 11/2013 | Aronoff et al. |
| 2002/0071041 A1 | 6/2002 | Pine |
| 2002/0085053 A1* | 7/2002 | Kao ................... B41J 2/04536 347/14 |
| 2008/0106564 A1 | 5/2008 | Lifshitz et al. |
| 2009/0015616 A1 | 1/2009 | Miyamoto |
| 2009/0231376 A1 | 9/2009 | Moriya |
| 2010/0283809 A1 | 11/2010 | Bastani et al. |
| 2012/0038957 A1 | 2/2012 | Umezawa |
| 2015/0360492 A1* | 12/2015 | Rius Rossell ........ B41J 2/04536 347/19 |

* cited by examiner

PRINT SATURATION CALIBRATION

BACKGROUND

A printing device, such as a printer, multifunction printer, and/or other such devices may be used to print content onto a physical medium, such as paper. For an ink based printing device, printing material (e.g., ink) may be ejected onto the physical medium to thereby print content onto a physical medium.

DRAWINGS

Figure 5A:
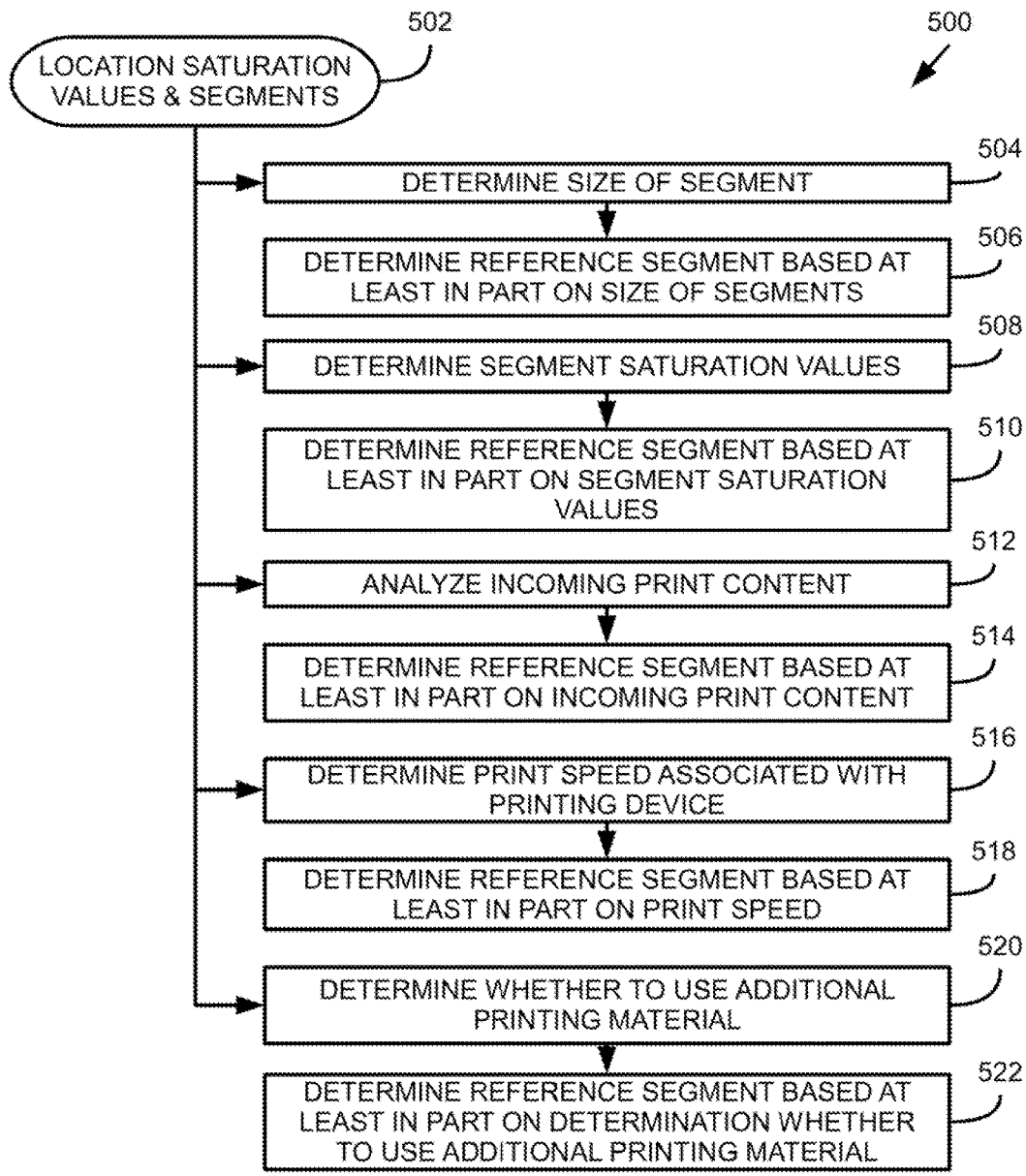
Figure 5B:
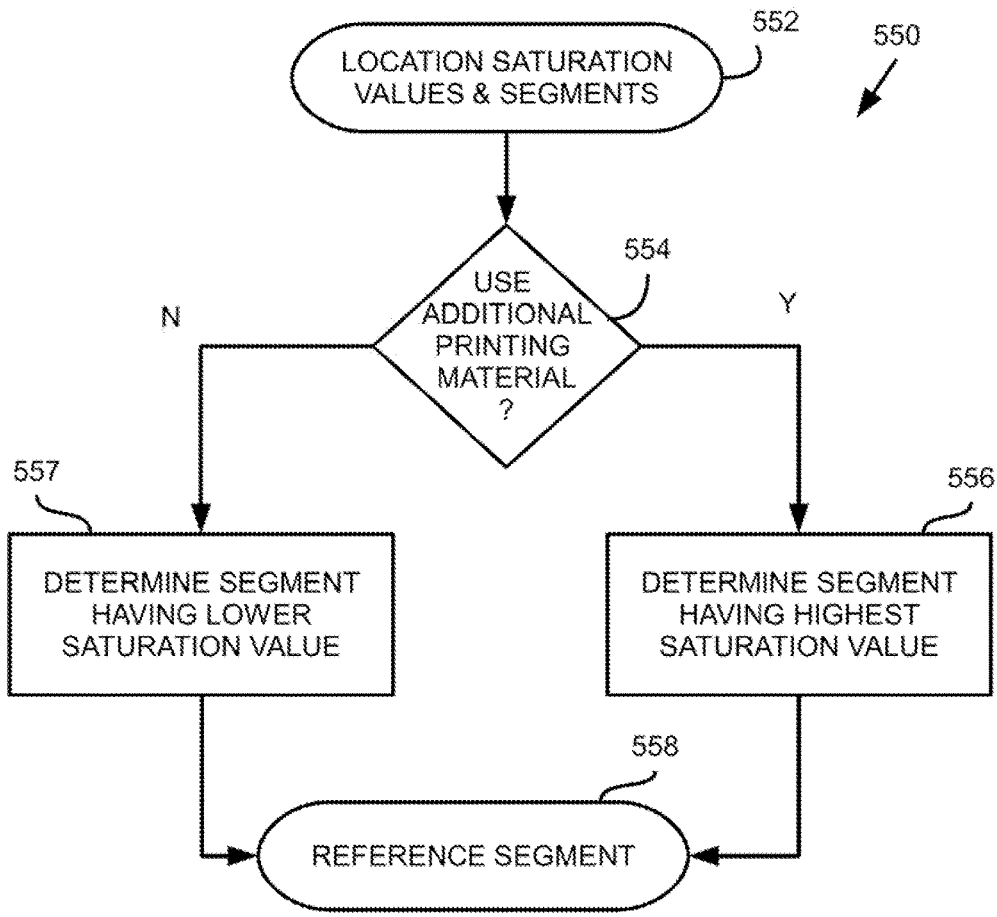

FIGS. 5A-B are flowcharts that illustrate example sequences of operations that may be performed by an example printing device.

Figure 6:
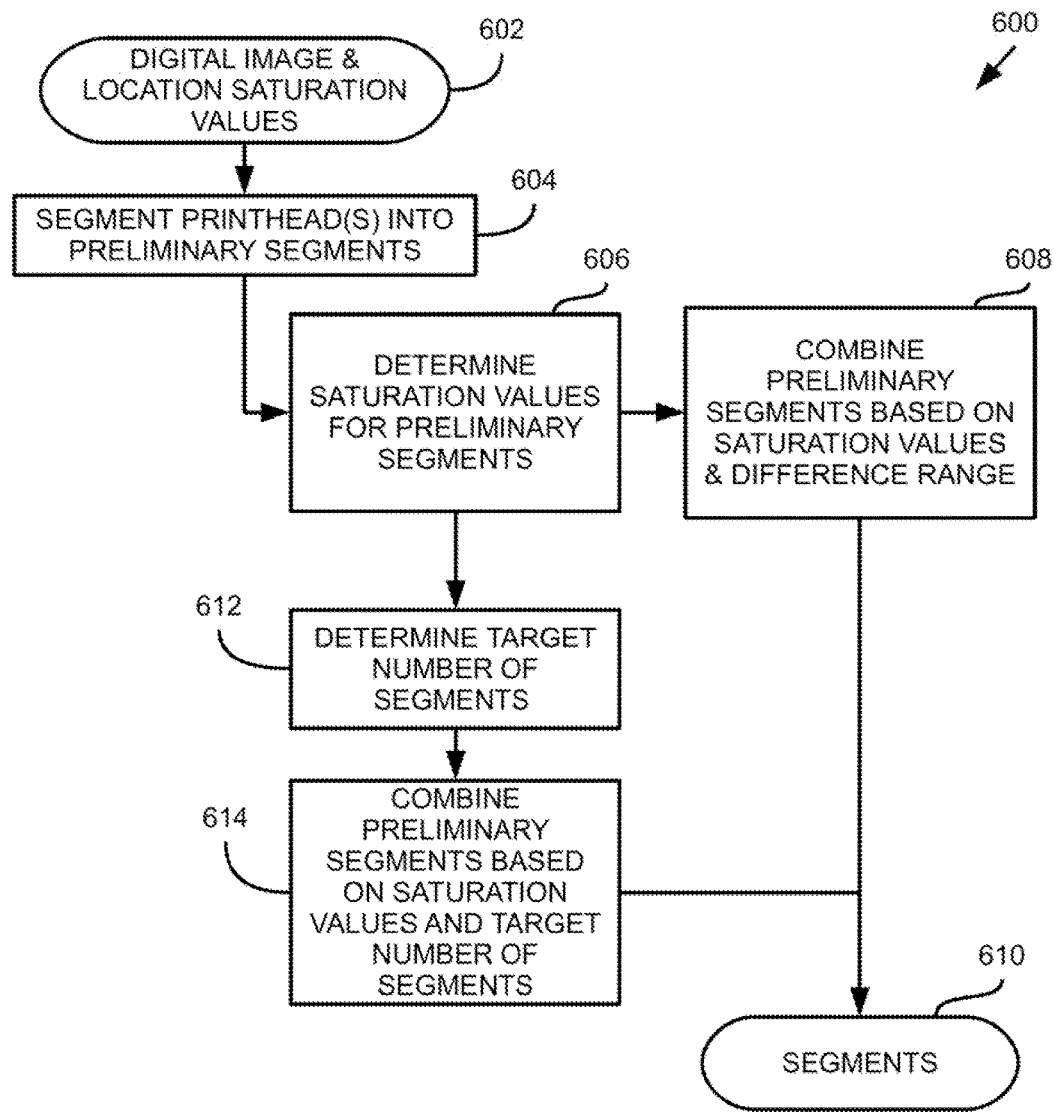

FIG. 6 is a flowchart that illustrates an example sequence of operations that may be performed by an example printing device.

Figure 7:
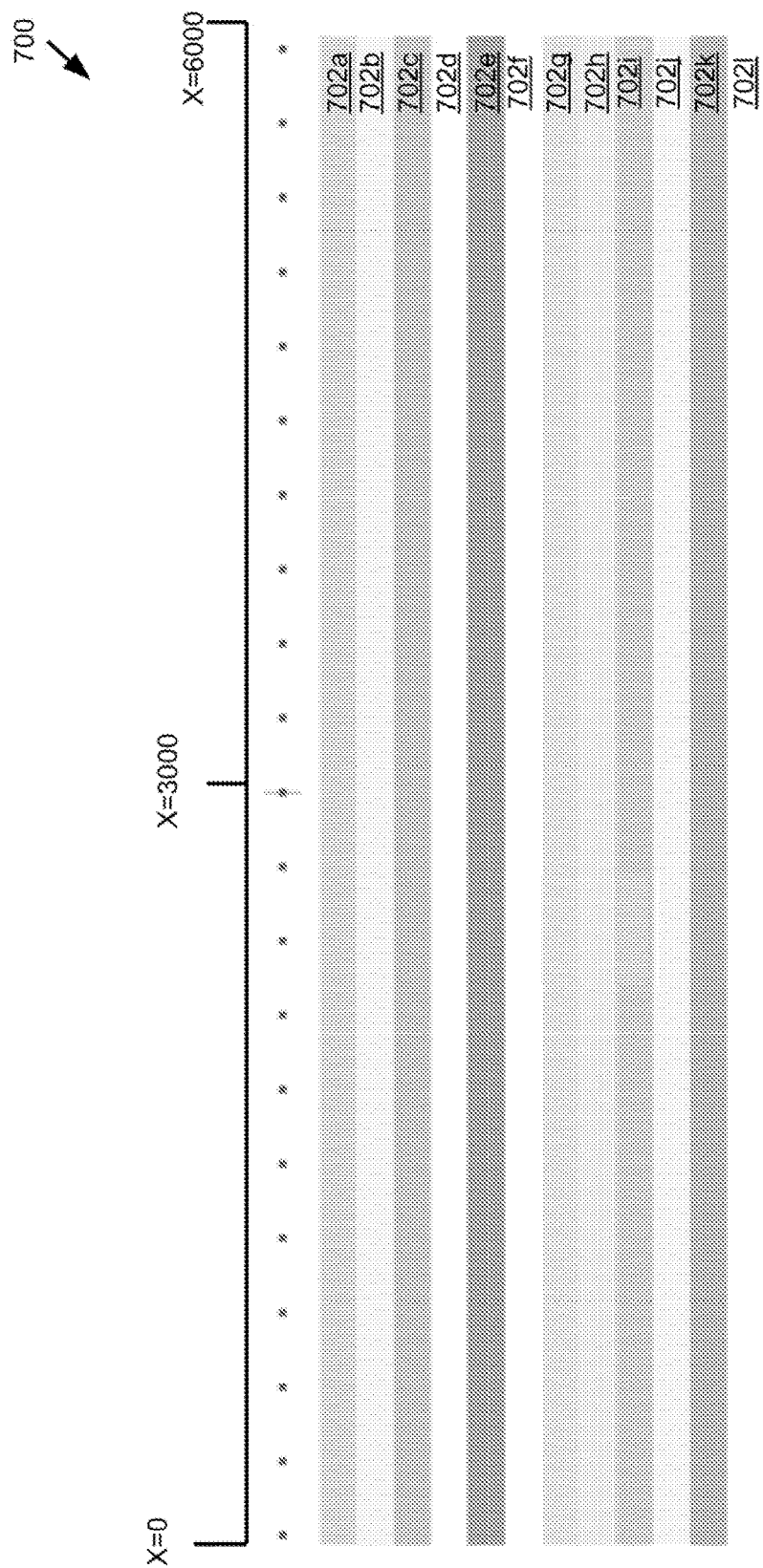

FIG. 7 is a block diagram that provides an example calibration image that play be sent to an example printing device for output thereby.

Figure 8A:
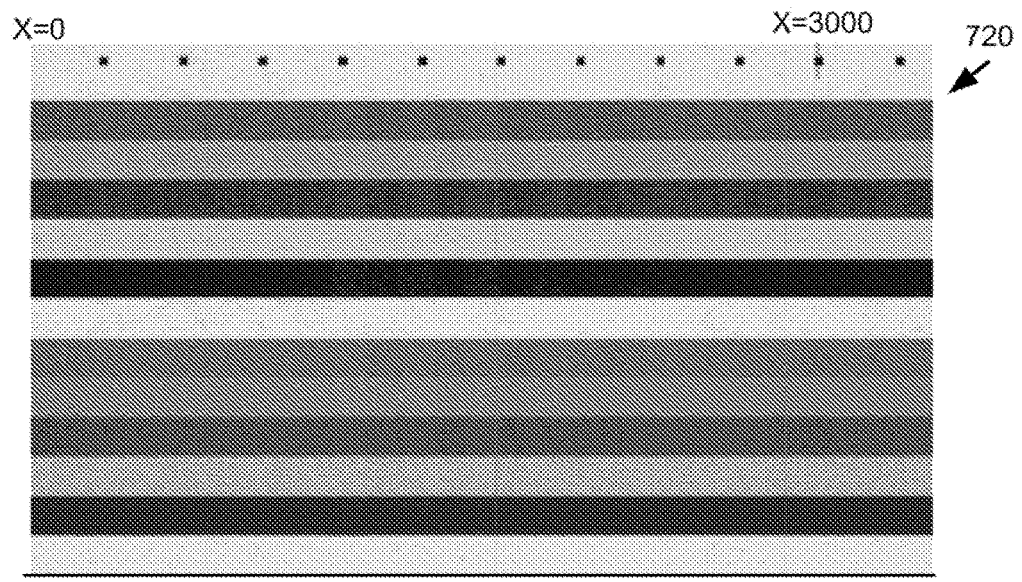
Figure 8B:
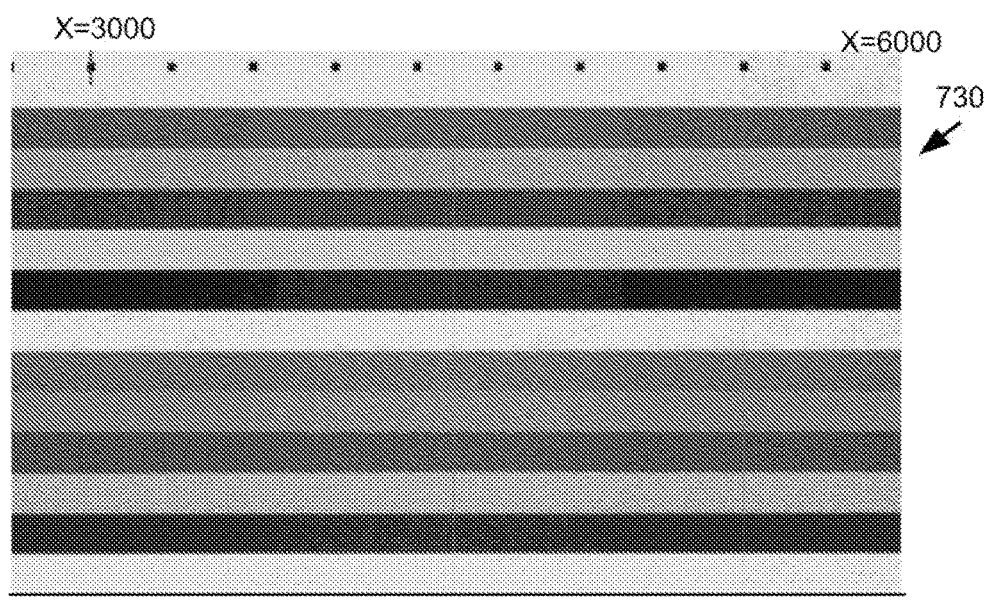

FIGS. 8A-B are block diagrams that provide example digital images of calibration output generated by an example printing device based on the calibration image of FIG. 7 and/or captured by an example printing device.

Figure 9A:
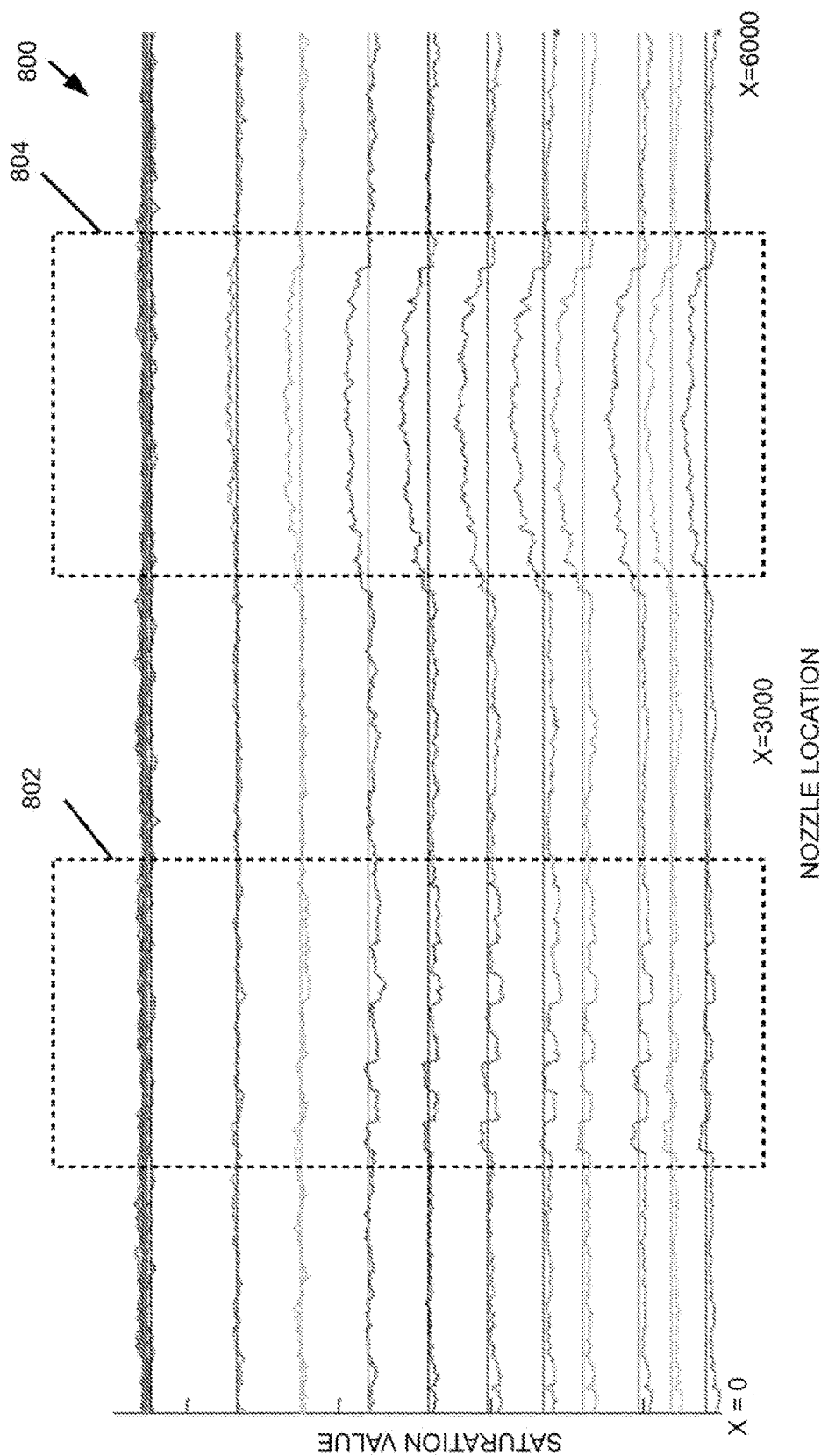
Figure 9B:
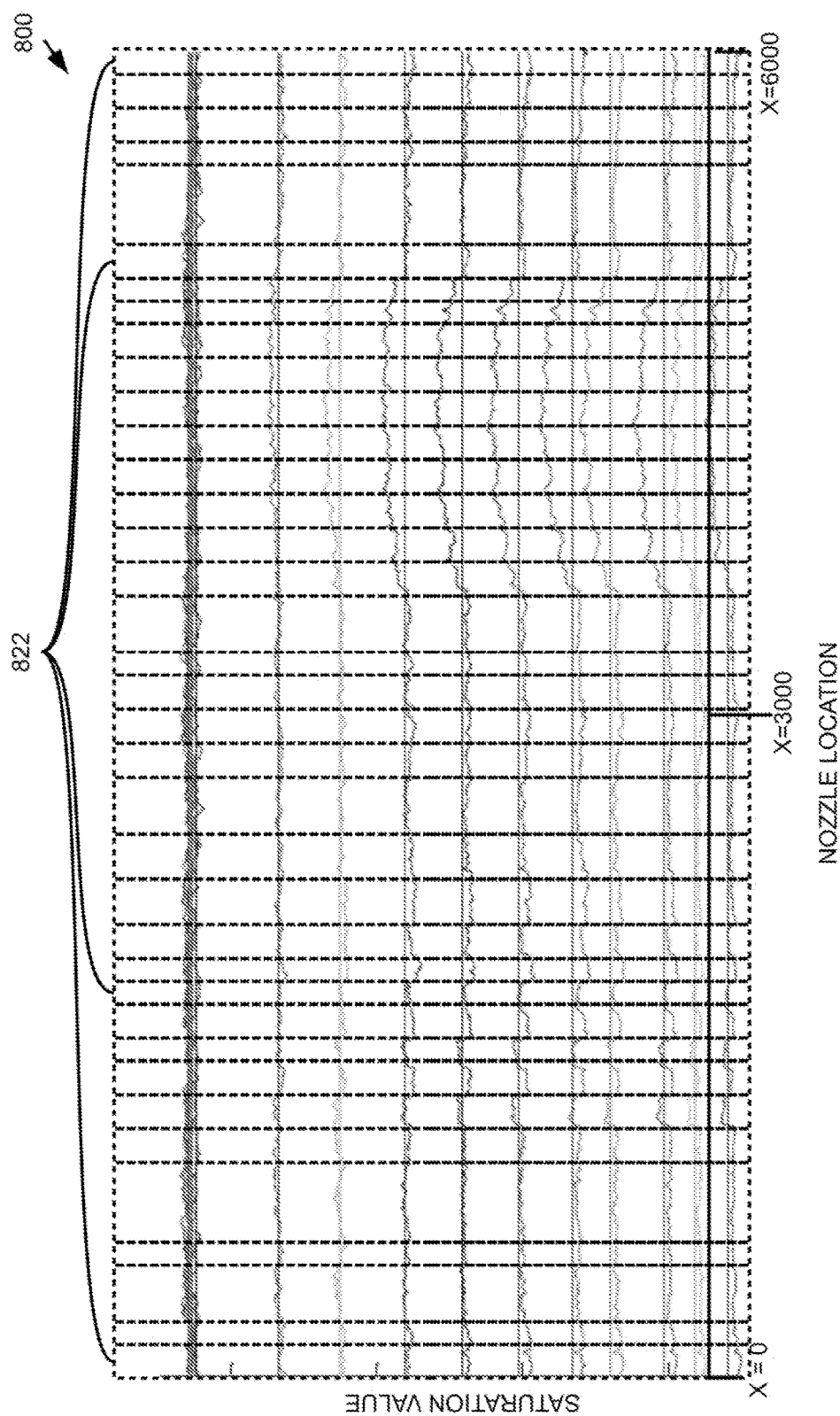
Figure 9C:
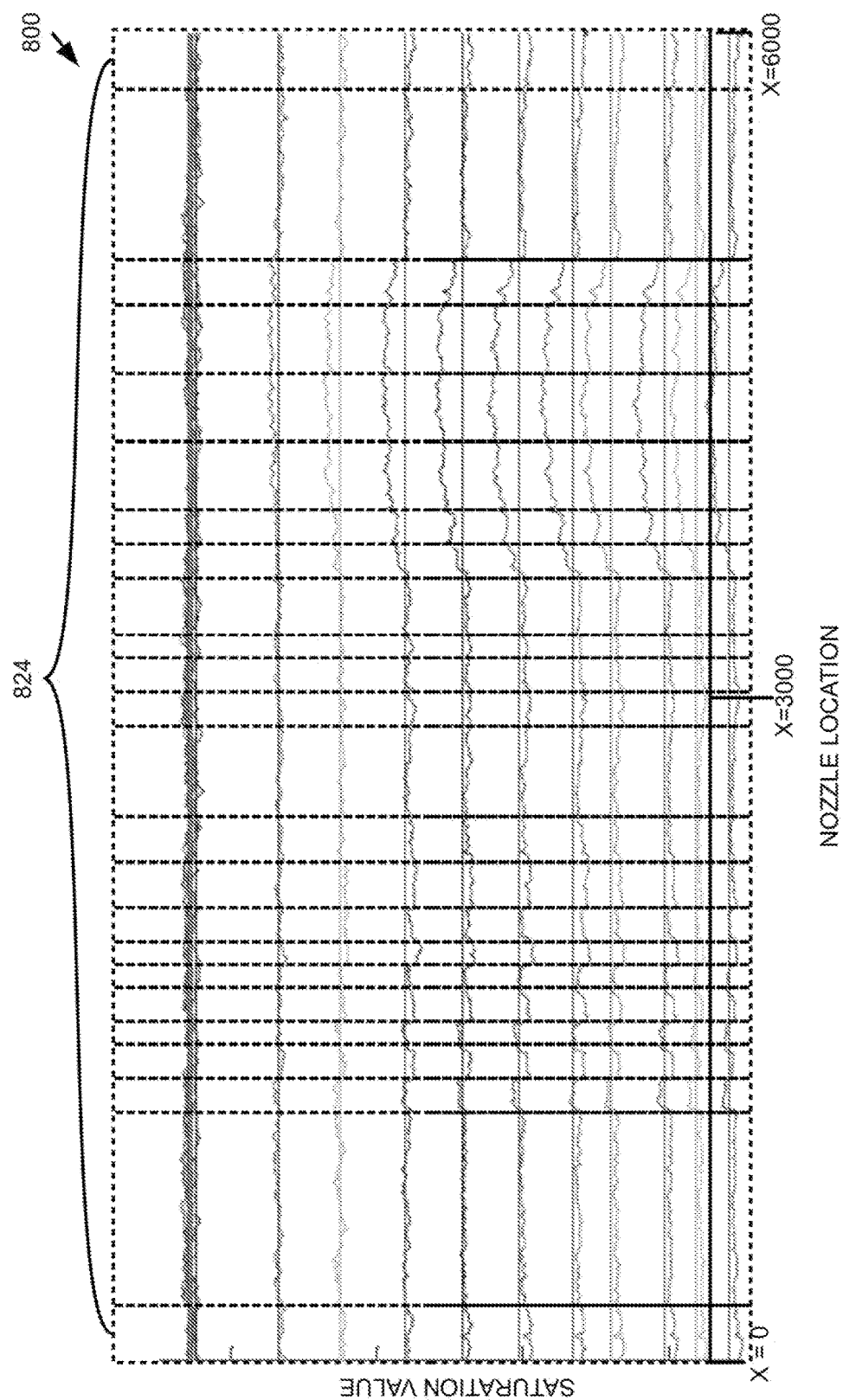

FIGS. 9A-C are example charts that provides example saturation values determined from the example digital images of FIGS. 8A-B.

Figure 10:
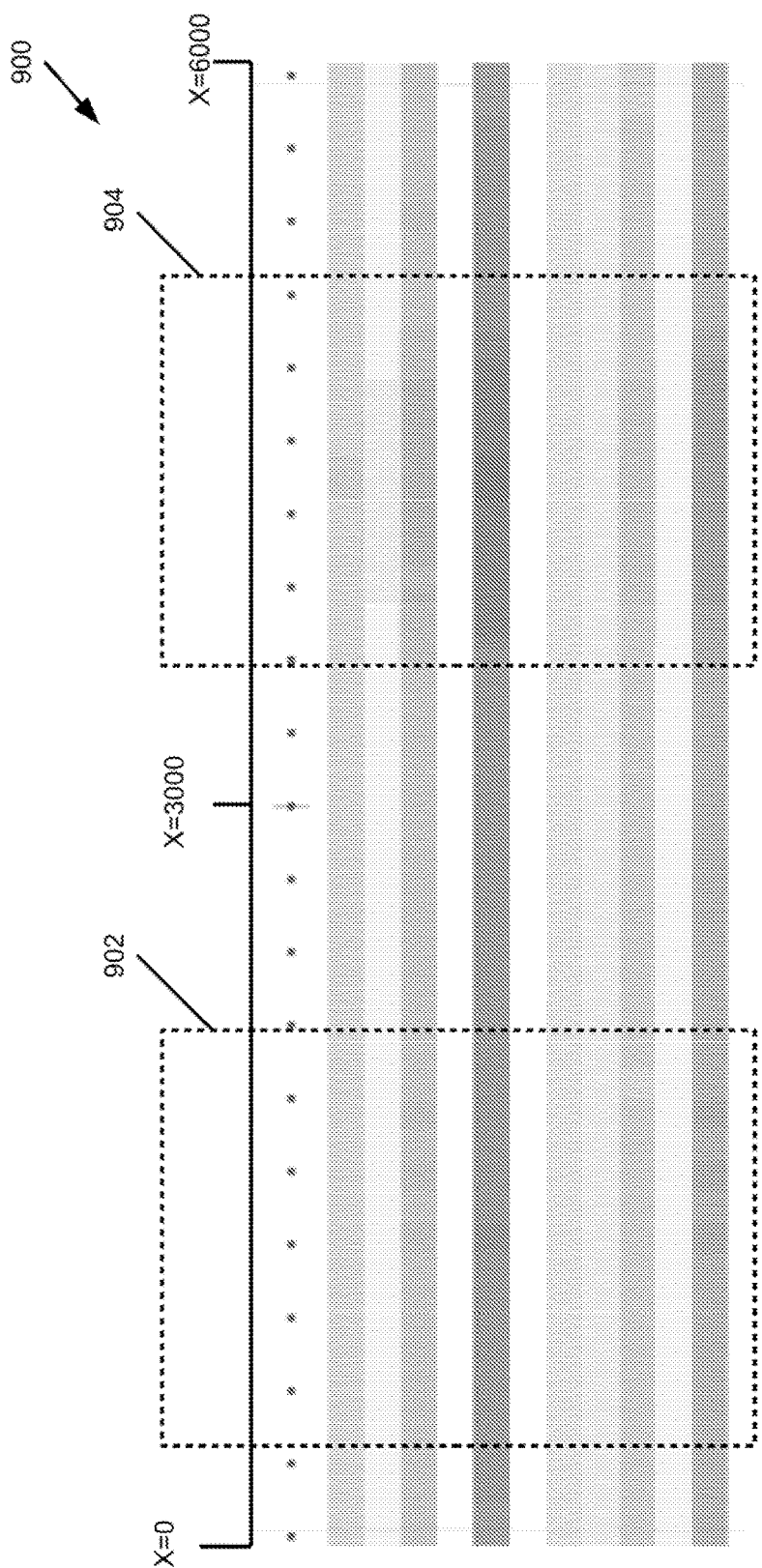

FIG. 10 is a block diagram that provides an example calibration image that has been adjusted based at least in part on example uniformity correction values that may be sent to an example printing device for output thereby.

Figure 11A:
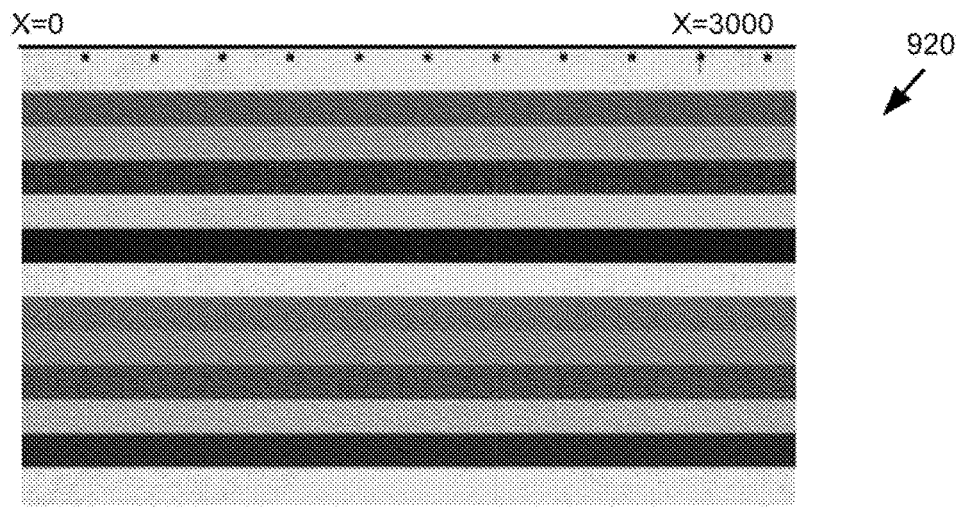
Figure 11B:
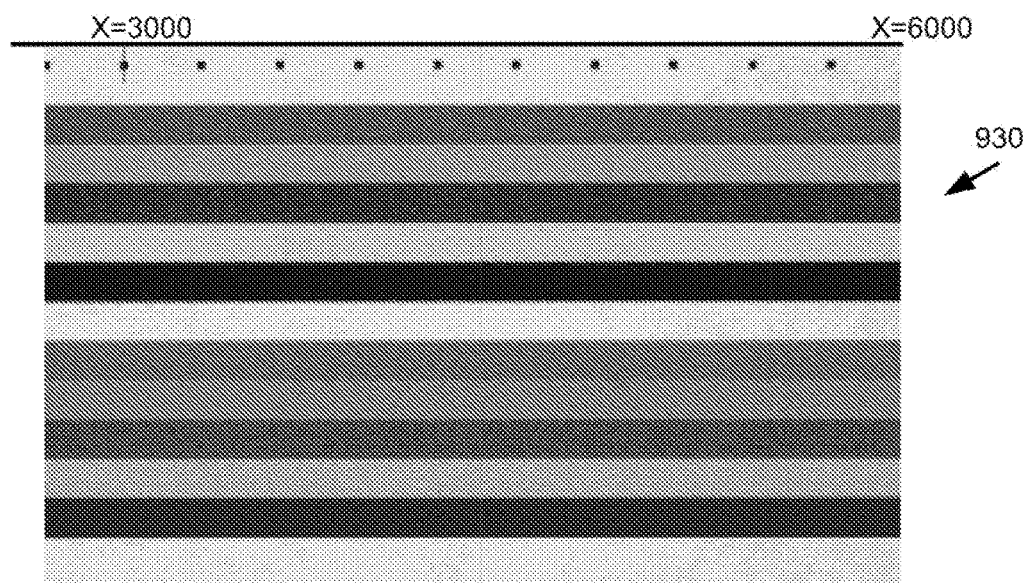

FIGS. 11A-B are block diagrams of example digital images of calibration output generated by an example printing device based on the calibration image of FIG. 10 and/or captured by an example printing device.

Figure 12:
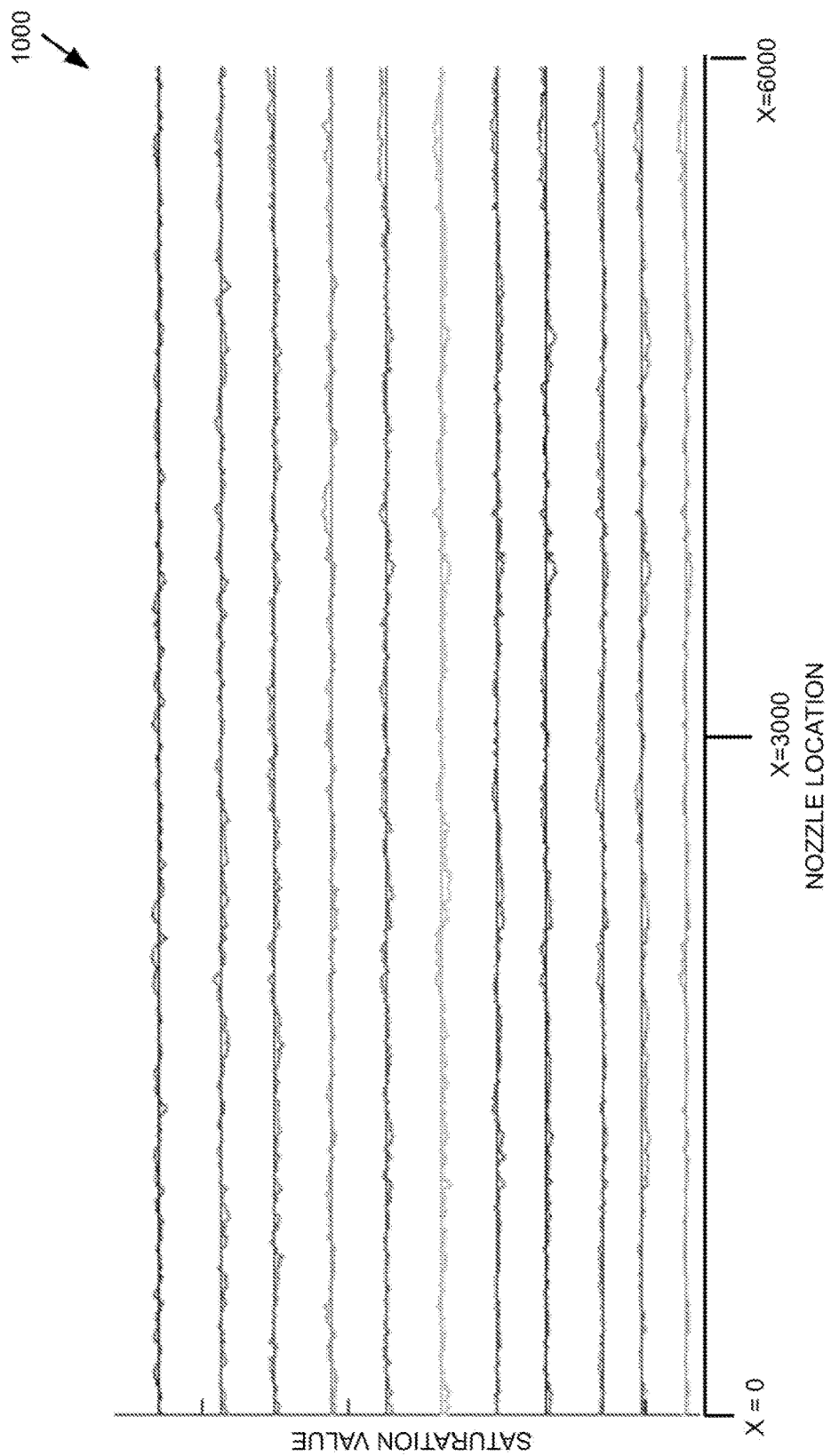

FIG. 12 is a chart that provides example saturation values determined from the example digital images of FIGS. 11A-B.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

In some printing devices, print modules may be incorporated in one or more printheads that span a printing width of a printing device. For example, in some page-wide printing devices, one or more printheads may span the width of the physical medium that may be used by the printing device, and each print-head may comprise one or more print modules for applying printing material to the physical medium. Each printhead and/or print module may comprise one or more nozzles for ejecting/dispensing/applying printing material. Generally, locations corresponding to a printing width of a printing device may be referred to as nozzle locations. For example, in web-fed printing devices, the printing width of the printing device may be referred to as the cross-web width, a cross-printing width, and/or a cross-printhead width, and a nozzle location may also be referred to as a cross-web location.

The one or more printheads are generally configured to eject, deposit, apply and/or position a printing material (e.g., ink, toner, pre/post treatment materials, gloss enhancers, varnishes, binding material, etc.) on physical medium to thereby print content. In some printing devices, print saturation, or just saturation, generally refers to a percentage of a particular primary printing color or other type of printing material at a given printed location (i.e., a pixel). For example, in an ink-based printing device that prints with cyan, magenta, yellow, and black primary colors, a pixel may have a saturation level of 0% to 100% for each primary color.

Since one or more printheads may comprise pluralities of print modules, slight differences in the print modules may result in non-uniform application of printing material on a physical medium, which may lead to non-uniform saturation of printing material on the physical medium. For example, in an ink-jet based printing device, fabrication variations in ejection nozzles of print modules of the ink-jet based printing device may cause non-uniform saturation of one or more inks in neighboring areas of printed content that should be substantially uniform. This may lead to visual inconsistencies in the printed content.

Examples of printing devices, processes, methods, and/or computer program products implemented in non-transitory machine-readable mediums comprising executable instructions may analyze digital images corresponding to content printed by a printing device and determine uniformity correction values that may be applied to print content to be printed by the printing device to thereby improve saturation uniformity of printing material on the physical medium. In some examples, a printing device may analyze one or more digital images corresponding to calibration output generated by the printing device. A location saturation value may be determined for each nozzle location of the printing device. Based at least in part on the location saturation values, the printing device may segment the printhead into a plurality of segments, where each segment may correspond to one or more neighboring nozzle locations. Therefore, in some examples, the segments of the printhead may be determined such that areas of contiguous nozzle locations that apply printing material approximately uniform may be grouped into segments. Generally, each segment of the printhead may correspond to an area/segment of the digital image such that analysis of the segments of the digital image may facilitate characterization of print modules of nozzle locations corresponding to the segments.

In some examples, the segments of the printhead may be determined such that each segment corresponds to an area of the digital image determined to have approximately uniform saturation of printing material. Generally, the calibration output of the one or more digital images may comprise cross-printing width saturation ramps including printing width-wide bars having various expected saturation levels, where the expected saturation levels correspond to the values of the saturation ramps of a calibration image input to the printing device as print content. As will be appreciated, examples may analyze location saturation values for nozzle locations and determine contiguous nozzle locations that generated similar location saturation values and/or contiguous nozzle locations determined to have location saturation values approximate to the expected saturation levels. Furthermore, whether location saturation values may be considered similar and/or approximately uniform may be determined based at least in part on a predefined difference range associated with saturation values. For example, if a location saturation value for each nozzle location corresponds to an 8-bit grayscale intensity value (i.e., values from 0 to 255), examples may define a relative difference range of grayscale intensity values that may be considered approximately uniform (e.g., 1 intensity unit difference, 2 intensity unit difference, etc.). As will be appreciated, the predefined difference range may generally depend on the configuration of the printing device and/or an image capture device used to capture the one or more digital images.

Therefore, in some examples, a printhead (and corresponding digital images comprising calibration output) may be segmented based on location saturation values. After segmentation, examples may determine a reference segment from among the plurality of segments. Generally, the reference segment may correspond to a saturation value to which all other segments of nozzle locations should be adjusted. A uniformity correction value may be determined for each segment based on the reference segment, where the uniformity correction value generally indicates a value by which saturation should be adjusted for the nozzle locations corresponding to the respective segment such that saturation in the respective segment is approximately uniform with the reference segment.

In some examples, a segment saturation value may be determined for each segment based at least in part on the location saturation values of the nozzle locations corresponding to the segment. For example, the segment saturation value may be based at least in part on an average of the location saturation values of the nozzle locations corresponding to the segment. An example printing device may determine the uniform correction value for each segment based at least in part on the segment saturation value for the segment and the segment saturation value for the reference segment.

For example, if a printing device is an ink-based printing device that is configured to use four primary colors of ink—e.g., cyan (C), magenta (M), yellow (Y), and black (K)—which is referred to as CMYK printing, an example calibration image may comprise a printhead wide saturation ramp (which may be referred to as a cross-printing width and/or cross-printhead saturation ramp) that includes various expected saturation levels (e.g., 0%, 10%, 20%, . . . 100%) for each primary color. The printing device may print the calibration image with the printhead on a physical medium to generate calibration output. The example printing device may capture one or more digital images of the calibration output. For example, the printing device may comprise one or more imaging devices, such as cameras, that may capture digital images of the calibration output. The example printing device may analyze the calibration output of the one or more digital images to determine a location saturation value for each nozzle location for one or more primary printing colors. For example, the digital images may be in grayscale such that a saturation value for a nozzle location for a primary color may be based on a grayscale intensity value for one or more pixels of the digital image that correspond to the nozzle location. In some examples, the printing device may convert the one or more digital images to grayscale.

In the example CMYK printing device, the printing device may determine a location saturation value for each nozzle location for each primary color. Generally, some example printing devices may comprise a printhead for each primary color. Therefore, in this example, the printing device may comprise a printhead for cyan, a printhead for magenta, a printhead for yellow, and a printhead for black. In this example, a nozzle location may generally correspond to a common print-width relative location on each printhead. In addition, the printing device may determine a primary color saturation value for each nozzle location. The example printing device may segment each printhead into a plurality of segments based at least in part on the location saturation values determined from the digital images, where each segment may correspond to one or more nozzle locations. For example, if the saturation values correspond to grayscale intensity values, the printing device may determine neighboring nozzle locations having grayscale intensity values approximately equal and/or within a predefined difference range to be segments. Generally, each segment may correspond to an area of the printhead that generates approximately uniform saturation when applying printing material to a physical medium. Furthermore, in examples comprising a printhead for each color, segmenting the digital image may comprise segmenting the digital image into a plurality of segments for each primary color printhead, where the size, number, and orientation of the segments of different primary color printheads may be the same or different.

Continuing the example, the printing device may segment each primary color printhead into the plurality of segments. From the plurality of segments, the example printing device may determine a reference segment for each primary color printhead, where the reference segment generally corresponds to a desired saturation level. Based on the reference segment, the example printing device may determine a uniformity correction value for each segment of each printhead. In the CMYK printing device example, the example printing device may determine a reference segment for each primary color printhead from among the plurality of segments corresponding to each primary color printhead. Generally, the uniformity correction value corresponds to a correction value that may be applied to print content prior to printing with the printing device to adjust one or more color levels of the print content to thereby increase saturation uniformity of printed content for the printing device.

For example, if a particular segment of a black color printhead is determined to have a saturation value that corresponds to a 2% lower saturation of the black ink color as compared to a reference segment for the black ink color, the uniformity correction value for the particular segment for the black primary color printhead of the printing device may correspond to the 2% saturation difference. In this example, incoming print content for the printing device may be adjusted such that the black level of the print content is correspondingly increased in areas of the print content that correspond to the particular segment of the black primary color printhead.

Some examples described herein may be configured for ink-based printing in one or more primary colors. As will be appreciated, printheads implemented in some example printing devices may be configured to eject/deposit/apply other types of printing material, including for example, non-ink based printing materials as well as non-color associated printing materials. For example, some printheads may be configured to apply pre/post processing treatments, gloss enhancers, varnishes, and/or other such types of printing materials. In some examples, location saturation values may be determined for nozzle locations corresponding to the application of such printing materials, and segments may be determined for such printheads as described herein.

Moreover, in some examples, a set of printheads may be implemented in a printing device for each type of printing material and/or each primary color of a type of printing material. In such examples, segmenting the printhead into the plurality of segments may comprise segmenting the set of printheads into the plurality of segments. In these examples, a reference segment may be determined for the set of printheads, and uniformity correction values may be determined for the segments of the set of printheads.

In some other examples, a single printhead may be implemented for all types of printing material and/or all primary colors of a type of printing material. For example, a single printhead may comprise a respective portion for each type of printing material and/or each primary color of a type of printing material. In such examples, segmenting the printhead into a plurality of segments may comprise segmenting each respective portion into a respective plurality of segments based on location saturation values for nozzle locations. In these examples, a reference segment may be determined for each respective plurality of segments, and uniformity correction values may be determined for each respective plurality of segments.

Figure 1:
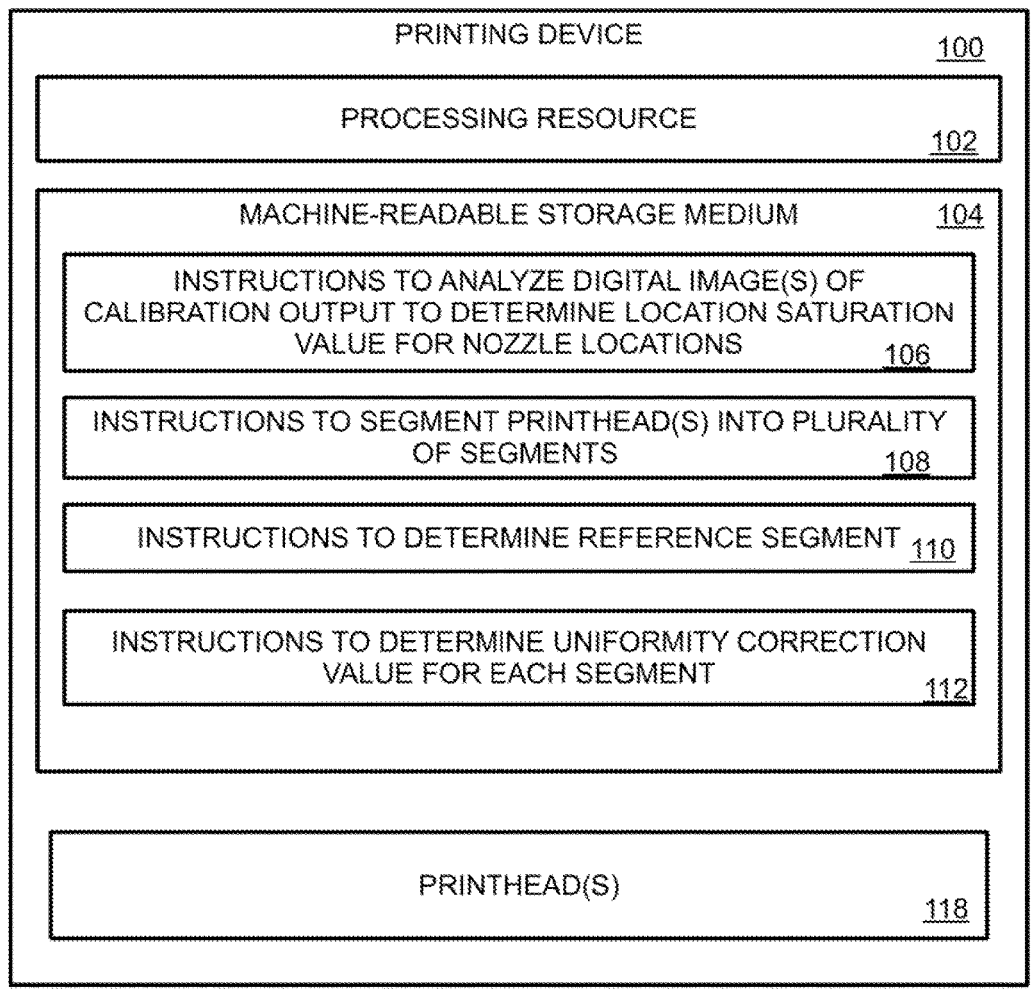
FIG. 1 is a block diagram of an example printing device.

Turning now to the figures, and particularly to FIG. 1, this figure provides a block diagram that illustrates an example printing device 100. While examples provided herein are described with respect to printing devices, some examples may be implemented in other types of computing devices, such as a personal computer, a portable electronic device (e.g., a smart phone, a tablet, a laptop, a wearable device, etc.), a workstation, smart device, server, and/or any other such data processing devices. In this example, the printing device 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single printing device 100 or distributed across multiple computing devices and/or printing devices connected locally and/or remotely. As will be appreciated, a processing resource 102 may comprise one or more general purpose data processors and/or one or more specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, etc. In addition, machine-readable storage medium 104 may be considered to include memory storage physically located elsewhere, e.g., any cache memory in a microprocessor, as well as any storage capacity used as a virtual memory, e.g., as stored on a mass storage device or on another computing device in communication with the example computing device 100. In some examples, the machine-readable storage medium may correspond to various types of storage mediums, such as computer readable storage medium, which may include volatile and non-volatile, removable and non-removable tangible media implemented in any technology for the storage and processing of information. Computer readable storage media may include RAM, ROM, erasable programmable read-only memory (EPROM), electrically erasable programmable read-only memory, flash memory or other solid state memory technology, portable compact disc memory, or other optical storage, or any other medium that may be used to store executable instructions and information. Furthermore, the machine-readable storage medium 104 may be non-transitory.

Generally, the machine-readable storage medium 104 may be encoded with and/or store instructions that may be executable by the processing resource 102, where execution of such instructions may cause the processing resource 102 and/or printing device 100 to perform the functionalities, processes, and/or sequences of operations described herein. In this example, the machine-readable storage medium 104 comprises instructions for calibrating saturation of printing material for an example printing device. In particular, the example machine-readable storage medium 104 comprises instructions to analyze one or more digital images of calibration output to determine a location saturation value for each of a plurality of nozzle locations of a printing device 106. The machine-readable storage medium 104 further comprises instructions to segment at least one printhead of the printing device into a plurality of segments of one or more nozzle locations based at least in part on the location saturation values 108. The machine-readable storage medium 104 further comprises instructions to determine a reference segment from the plurality of segments 110. In addition, the machine-readable storage medium 104 comprises instructions to determine a uniformity correction value for each segment based at least in part on the reference segment 112.

Generally, a uniformity correction value for a segment corresponds to a value that may be used to adjust a portion of incoming print content associated with the segment of the at least one printhead/nozzle locations such that the at least one printhead, upon printing the incoming print content, may apply printing material having an approximately uniform saturation relative to the reference segment for print content which should be uniform in saturation. As will be appreciated, a uniformity correction value determined for a reference segment may be nominal such that a portion of incoming print content associated with the reference segment may not be adjusted.

While not shown in this example, for interface with a user or operator, the example printing device 100 may include a user interface incorporating one or more user input/output devices, e.g., one or more buttons, a display, a touchscreen, a speaker, etc. The user interface may therefore communicate data to the processing resource 102 and receive data from the processing resource 102. For example, a user may input one or more selections via the user interface, and the processing resource 102 may cause data to be output on a screen or other output device of the user interface. Furthermore, the printing device 100 may comprise a network interface device. Generally, the network interface device comprises one or more hardware devices to communicate data over one or more communication networks, such as a network interface card. As shown, the example printing device 100 comprises one or more printheads 118 that are configured to print content by applying/ejecting/depositing printing material onto a physical medium. In some examples, the printing device 100 may comprise at least one printhead 118 for each type of printing material in which the printing device 100 is configured to print. For example, in an ink-based printing device, the printing device may comprise a printhead for each primary color of ink in which the printing device is configured to print.

Figure 2:
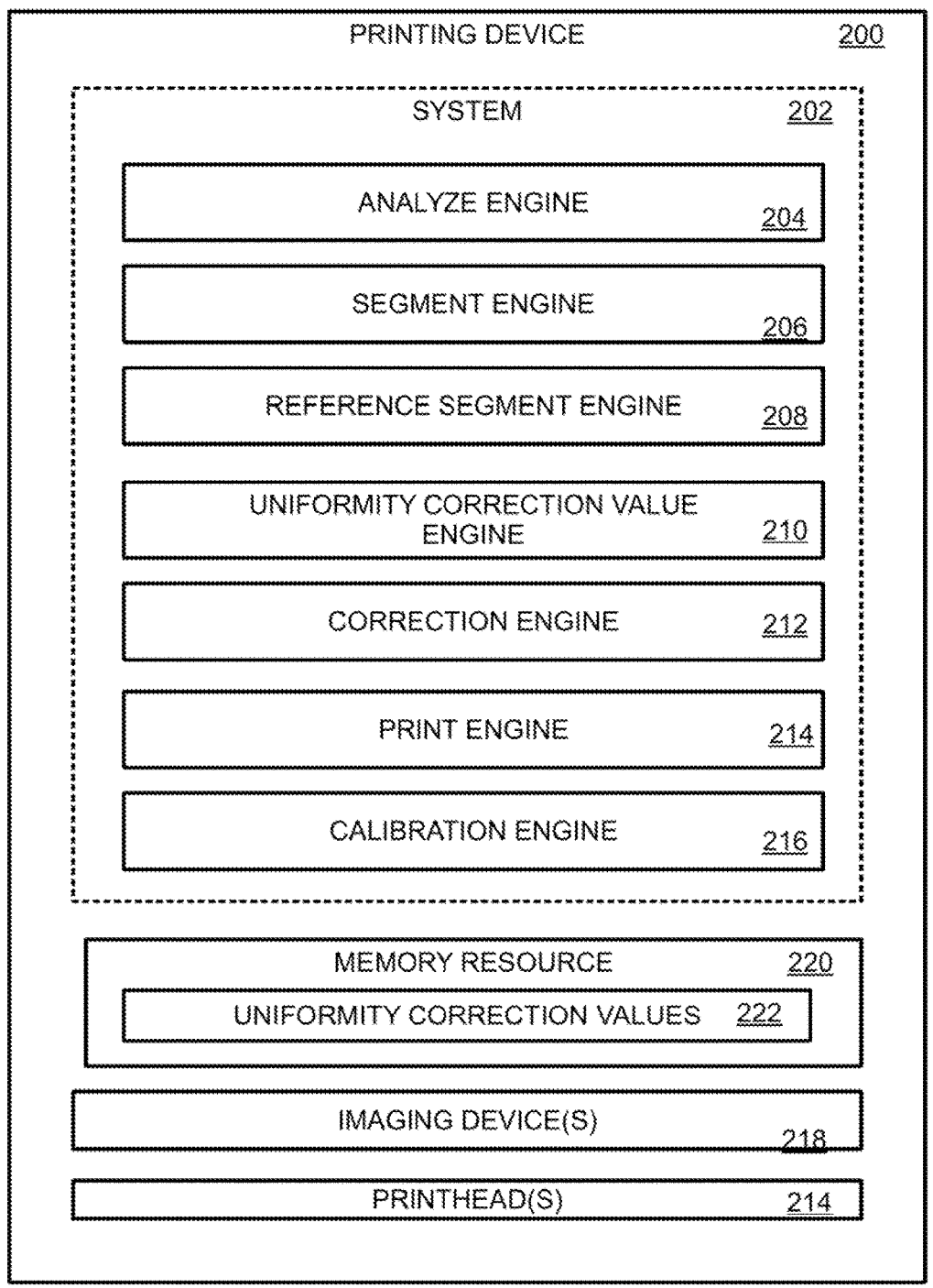
FIG. 2 is a block diagram of an example printing device.

FIG. 2 provides a block diagram of an example printing device 200. Printing devices, as described herein, may generally be used to print content onto a physical medium (also referred to as media), such as paper. Examples of printing devices include ink-based printing devices, toner-based printing devices, thermal inkjet printers, piezo inkjet printers, etc. As will be appreciated, a digital image communicated to a printing device for printing thereby may be referred to as print content. Furthermore, a digital image may be configured as a calibration image, where printing of the calibration image may generate calibration output on media. Furthermore, engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing device implementing such engines may include the machine-readable storage medium storing the instructions and the processing resource to execute the instructions, or the machine-readable storage medium may be separately stored and accessible by the computing device and the processing resource. In some examples, some engines may be implemented in circuitry. In this example, the printing device 200 comprises a system 202 including engines 204-216.

In the example printing device 200 of FIG. 2, the printing device and system 202 include an analyze engine 204 to analyze at least one digital image corresponding to a calibration output of the printing device 200 to determine a location saturation value for each of a plurality of nozzle locations on the printing device. The printing device 200 further comprises a segment engine to segment the at least one printhead into a plurality of segments of approximately uniform saturation based at least in part on the location saturation value for each nozzle location, where each segment corresponds to one or more nozzle locations. The printing device also comprises a reference segment engine 208 to determine, from the plurality of segments, a reference segment.

The printing device 200 further comprises a uniformity correction value engine 210 to determine a uniformity correction value for each segment based at least in part on the reference segment. Furthermore, the example printing device 200 may comprise a correction engine 212 to adjust print content for the printing device based at least in part on the uniformity correction value for each segment. In addition, the printing device 200 may comprise a print engine 214 to cause printing of print content after adjustment by the correction engine. In this example, the printing device 200 further comprises a calibration engine 216 to generate the calibration output with one or more printheads 214 on a physical medium and to capture the at least one digital image of the calibration output with one or more imaging devices 218 of the printing device 200. The imaging devices 218 may comprise one or more cameras or other such devices configured to capture image data. As used herein, digital images generally comprise image data collected from any optical sensor based device/image sensor based device. Imaging devices 218 may comprise one or more cameras. In some examples, imaging devices 218 may comprise one or more sensors configured for light-based measurement, such as a spectrophotometer.

In this example, the printing device 200 comprises a memory resource 220 that stores uniformity correction values 222. Generally, the memory resource may be a machine-readable storage medium, where the memory resource may be implemented in one or more storage devices and/or levels of memory thereof. The uniformity correction values 222 stored in the memory resource 220 may be stored in a one-dimensional look-up table, where the dimension may correspond to an area of a particular printhead and/or a plurality of contiguous nozzle locations corresponding to a respective segment. In other examples, the uniformity correction values may be stored in a multi-dimensional (e.g., 2 dimensional, 3 dimensional, etc.) look-up table, polynomial coefficients, gain and offset values relative to a baseline, pointers to correction curves, and/or other such types of data structures.

Moreover, as will be appreciated, in example printing devices comprising more than one printhead (such as the example CMYK printing device discussed previously), the uniformity correction values 222 may be stored in separate data structures for each respective printhead. Referring to the example CMYK printing device described previously, for example, the printing device may comprise a look-up table storing uniformity correction values as a function of segment and/or nozzle location for each primary color printhead. In another example, the CMYK printing device may store uniformity correction values for each printhead in a multi-dimensional look-up table.

As will be appreciated, the operations and sequences of operations described with regard to engines 204-216 may be performed in one or more engines that may be implemented in a printing device 200 and/or other such computing device. Generally, examples of computing devices, such as printing devices, described herein may not be limited to the specific implementations of engines illustrated in this example. In this regard, some examples of printing devices may be configured with more or less engines, where engines may be configured to perform more or less operations. Furthermore, in some examples, the engines may be implemented by execution of instructions with one or more processing resources to cause the processing resources to perform the corresponding operations.

FIGS. 3-6 provide flowcharts that provide example sequences of operations that may be performed by an example printing device, and/or a processing resource thereof to perform example processes and methods of the disclosure. In some examples, the operations included in the flowcharts may be embodied in a memory (such as the machine-readable storage medium 104 of FIG. 1) in the form of instructions that may be executable by a processing resource to cause a printing device (e.g., the printing device 100 of FIG. 1, the printing device 200 of FIG. 2, etc.) to perform the operations corresponding to the instructions. Additionally, the examples provided in FIGS. 4 and 5 may be embodied in computing devices, machine-readable storage mediums, processes, and/or methods. In some examples, the example processes and/or methods disclosed in the flowcharts of FIGS. 3-6 may be performed by one or more engines implemented in a computing device, such as the example engines 204-216 of FIG. 2.

Figure 3:
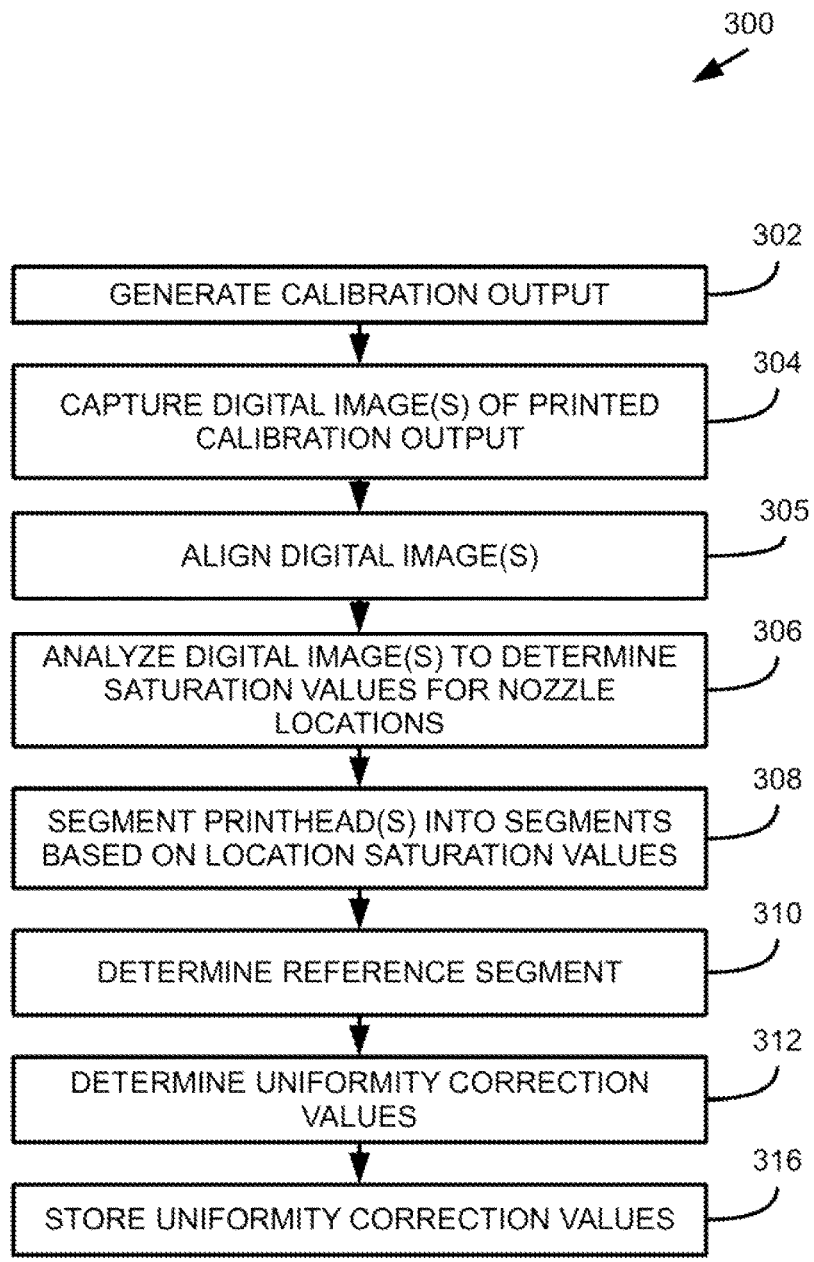
FIG. 3 is a flowchart that illustrates an example sequence of operations that may be performed by an example printing device.

FIG. 3 is a flowchart 300 that illustrates an example sequence of operations that may be performed by a printing device. In this example, the printing device prints a calibration image to generate calibration output for the printing device (block 302). As discussed previously, the calibration output may comprise a cross-printhead and/or print-wide saturation ramp from expected saturation levels of 0% to 100% for each of one or more printheads. The printing device captures one or more digital images corresponding to the printed calibration output (block 304). Example printing devices may be configured with one or more image capture devices (e.g., digital cameras, etc.) with which the one or more digital images of the calibration output may be captured. In some examples, when more than one digital image is captured for the calibration output, a printing device may align the digital images (block 305). The digital images may be aligned based at least in part on image overlap and/or edges of the physical medium. Generally, the digital images may be aligned such that a response from the imaging device in each digital image is approximately uniform.

The printing device analyzes the digital images to determine a location saturation value for each nozzle location of the printing device (block 306). Based on the location saturation values, the example printing device segments the at least one printhead into a plurality of segments (block 308), where each segment corresponds to one or more nozzle locations of the printing device. As will be appreciated, segmenting the at least one printhead into the plurality of segments may comprise determining each segment of nozzle locations based at least in part on the location saturation values such that contiguous nozzle locations having approximately uniform location saturation values may be determined to be in a respective segment. The printing device determines, from among the plurality of segments, a reference segment (block 310). Generally, the reference segment corresponds to a saturation value to which all other segments should be adjusted. In some examples, the reference segment may be determined to be the segment of the plurality having a lowest segment saturation value. In other examples, the reference segment may be determined to be the segment of the plurality having a highest segment saturation value. Other examples may determine the reference segment based on a variety of factors, including, for example, print speed, user input data, etc.

Based on the determined reference segment, the example printing device may determine a uniformity correction value for each segment based on the reference segment (block 312). For example, if a particular segment having a highest segment saturation value is determined to be the reference segment, the printing device may determine a uniformity correction value for the remaining segments that will increase saturation of printing material applied with nozzle locations of the remaining segments to match the printing material saturation of the nozzle locations of the reference segment. The printing device may store the uniformity correction values in a memory resource associated with the printing device (block 316). As discussed previously, the uniformity correction values may be stored in various types of data structures, including, for example, look-up tables, polynomial coefficients, gain and offset relative to a baseline, pointers to correction curves, etc.

Figure 4:
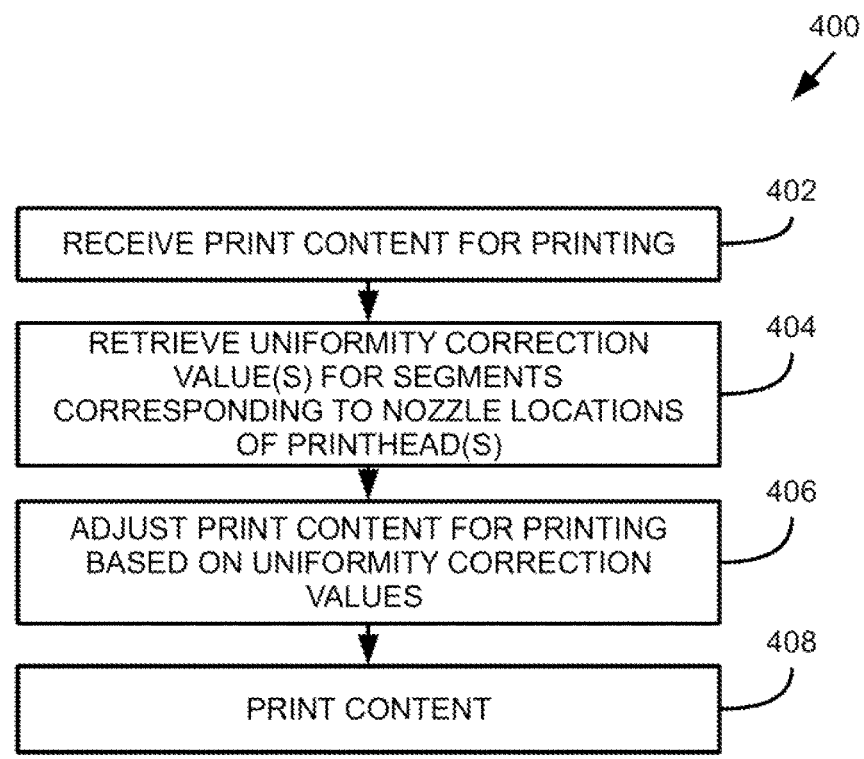
FIG. 4 is a flowchart that illustrates an example sequence of operations that may be performed by an example printing device.

FIG. 4 provides a flowchart 400 that illustrates a sequence of operations that may be performed by an example printing device. As shown, the printing device receives print content for printing thereby (block 402). The printing device retrieves uniformity correction values for segments corresponding to one or more locations of one or more printheads of the printing device (block 404), and the printing device adjusts the print content based on the uniformity correction values (block 408). Generally, the uniformity correction values may be applied to print content to adjust one or more color levels of the print content in portions of the print content that will be printed by nozzle locations of the segments. As will be appreciated, by adjusting one or more color levels in one or more areas of the print content, saturation of printing material may be adjusted for nozzle locations associated with the areas of the print content. For example, if a uniformity correction value for a particular segment corresponding to a set of nozzle locations indicates that the print material saturation for the segment is 1% lower relative to the print material saturation of for the nozzle locations of a reference segment for black ink, the printing device may increase black color levels in a print content area that corresponds to the nozzle locations associated with the particular segment. After adjusting the print content, the printing device may print the adjusted print content (block 408).

FIG. 5A provides a flowchart 500 that illustrates an example sequence of operations that may be performed by a printing device. In this example, the printing device may determine a reference segment from among a plurality of segments having location saturation values corresponding thereto (block 502). In some examples, the printing device may determine a size of each segment (block 504), and the printing device may determine the reference segment based at least in part on a size of each segment (block 506). Generally, a segment size corresponds to a number of nozzle locations corresponding to the segment. For example, in some printing devices, nozzle locations may be described with reference to a horizontal pixel position across a printing-width of the printing device. In these examples, the size of a segment may be described with regard to the number of pixels determined to correspond to the segment. In some examples, a segment having a smallest size may be determined to be the reference segment. In such examples, a segment having a smallest size may be determined as the reference segment to address issues such as streaks of high or low saturation associated with the reference segment and/or other such factors. In other examples, a segment having a largest size may be determined to be the reference segment. In such examples, a segment having a largest size may be determined as the reference segment to reduce the number of nozzle locations for which adjustment may be performed and/or other such factors.

In some examples, a segment saturation value may be determined for each respective segment based at least in part on the location saturation values of nozzle locations corresponding to the respective segment (block 508). For example, a segment saturation value may be determined based at least in part on an average of the location saturation values of nozzle locations corresponding to the segment. The printing device may determine the reference segment based at least in part on the segment saturation values (block 510). For example, if the calibration output comprises print-width spanning saturation ramps for a particular primary color, the printing device may determine an average saturation value for each ramp of the calibration output, and the printing device may determine a particular segment having a segment saturation value closest to the average saturation value for each ramp to be the reference segment.

In some examples, the printing device may analyze incoming print content (block 512), and the printing device may determine the reference segment based at least in part on the incoming print content (block 514). For example, the printing device may analyze incoming print content to determine whether higher saturation of printing material may be implemented or whether lower saturation of printing material may suffice. For example, if the print content comprises high resolution digital images that include high detail and/or fine features higher saturation of printing material may be implemented by determining a particular segment having a higher relative segment saturation value to facilitate high quality visual appearance of the printed print content. Similarly, if the incoming print content comprises relatively lower resolution digital images, lower saturation of printing material may be implemented by determining a particular segment having a lower relative segment saturation value to reduce printing material usage in generating the printed print content.

In some examples, the printing device determines a print speed associated with the printing device (block 516), and the printing device determines a reference segment based at least in part on the print speed (block 518). Generally, a printing device may be configured to print at one or more speeds, and a print speed may generally affect a saturation level that the printing device may achieve. Therefore, in some examples, the printing device may determine whether the printing device is configured to print incoming print content at a higher relative print speed, and, in these examples, the printing device may determine a particular segment having a lower relative segment saturation value to be the reference segment. In some examples, the printing device may determine whether the printing device is configured to print incoming print content at a lower relative print speed, and, in these examples, the printing device may determine a particular segment having a higher relative segment saturation value to be the reference segment.

In some examples, the printing device determines whether to use additional printing material (block 520), and the printing device determines a reference segment based at least in part on the determination of whether to use additional printing material (block 522). Generally, determining a particular segment having a higher relative segment saturation value corresponds to the usage of additional printing material, and determining a particular segment having a lower relative segment saturation value corresponds to not using additional printing material. For example, in an ink-based printing device, determining a particular segment having a highest segment saturation value to be the reference segment may result in increasing the usage of additional ink at other segments. As another example, in the ink-based printing device, determining a particular segment having a lowest segment saturation value to be the reference segment may result in lowering the usage of additional ink at other segments.

FIG. 5B provides a flowchart 550 that illustrates an example sequence of operations that may be performed by an example printing device based at least in part on location saturation values and a plurality of segments (block 552) determined for nozzle locations of the printing device. In this example, the printing device determines whether to use additional printing material (block 554). Generally, the determination whether to use additional printing material may be based at least in part on a print speed associated with the printing device, user input data (such as a desired print quality, etc.), incoming print content, and/or other such printing variables. For example, if user input data received at the printing device indicates a desired print quality corresponding to relatively higher saturation, the printing device may determine to use additional printing material. Responsive to determining to use additional printing material ("Y" branch of block 554), the printing device determines a particular segment of a plurality of segments having a highest segment saturation value to be the reference segment (blocks 556, 558). Responsive to determining that to not use additional printing material ("N" branch of block 554), the printing device determines a particular segment of the plurality of segments having a lowest segment saturation value to be the reference segment (blocks 557, 558).

FIG. 6 provides a flowchart 600 that illustrates an example sequence of operations that may be performed by a printing device at least in part on location saturation values determined for nozzle locations of the printing device from a digital image comprising calibration output for the printing device (block 602). In this example, the printing device may segment the at least one printhead into a plurality of preliminary segments based at least in part on the location saturation value of each nozzle location (block 604), where each preliminary segment corresponds to one or more contiguous nozzle locations having an approximately uniform saturation. Generally, a printing device may determine that contiguous nozzle locations correspond to a particular preliminary segment if the location saturation value of each nozzle location is within a predefined difference range of the saturation values of the other nozzle locations. A segment saturation value may be determined for each preliminary segment (block 606) based at least in part on the location threshold values of nozzle locations corresponding to the preliminary segment.

In some examples, some preliminary segments may be combined into larger segments based at least in part on the segment saturation value for each preliminary segment (block 608) to thereby determine one or more segments (block 610) of a plurality of segments that each correspond to one or more nozzle locations. For example, if the segment saturation value for each preliminary segment corresponds to an average grayscale intensity value for nozzle locations corresponding to the preliminary segment, some examples may combine neighboring/contiguous preliminary segments having a segment saturation value within a predefined grayscale intensity range.

In some examples, the printing device may determine a target number of segments (block 612) into which the preliminary segments are to be combined. For example, a target number of segments may be determined based at least in part on processing and/or memory resources associated with the printing device. In such examples, storing of uniformity correction values may be limited in memory resource allocation, such that the printing device may determine a target number of segments based at least in part on the memory resource allocation for uniformity correction values. For example, if a printing device comprises a fixed memory into which uniformity correction values may be stored in a table, a target number of segments may be determined based at least in part on the fixed memory. Similarly, in some examples, processing resources available for processing the digital image, determining uniformity correction values, and/or adjusting print content with uniformity correction values may be limited. In these examples, a printing device may determine a target number of segments based on processing resource availability. As will be appreciated, determining a target number of segments may be implemented to limit usage of processing and/or memory resources. Therefore, example printing devices may combine preliminary segments into the determined target number of segments based at least in part on location saturation values and/or segment saturation values (block 614) to thereby determine a plurality of segments corresponding to one or more nozzle locations.

As another example, in an ink-based printing device, (such as the example CMYK printing device described previously), a target number of segments may be determined for each primary color printhead. As will be appreciated, in some examples a number of target segments may be determined for each primary color printhead based at least in part on a contrast associated with each color, such that primary color having higher contrast may have more target segments, whereas primary colors having a lower contrast may have less target segments. In other examples, a number of target segments may be determined based at least in part on incoming print content. For example, primary colors that are used in relatively higher amounts in incoming print content may have a correspondingly higher number of target segments. In some examples, primary colors having a relatively larger saturation difference magnitude and ink contrast may have a correspondingly higher number of target segments.

FIG. 7 provides a block diagram that illustrates an example calibration image 700 that may be processed by a printing device to generate a calibration output on a physical medium. As shown in the example, the calibration image comprises a plurality of saturation ramps 702a-l that span a printing width of a printing device. In this example, nozzle locations spanning the printing width are labeled from X=0 to X=6000, which generally corresponds to a pixel location of the calibration image. As discussed, in some examples, a nozzle location may be described with respect to a pixel location of print content.

FIGS. 8A-B provide example digital images 720, 730 of calibration output that may be captured by one or more imaging devices of a printing device and analyzed. In this example, the digital images 720, 730 collectively comprise the calibration output of a printing device, where a first digital image 720 (of FIG. 8A) corresponds to nozzle locations X=0 to approximately X=3300, and a second digital image 730 corresponds to nozzle locations approximately X=2700 to X=6000. Therefore, in this example, the digital images 720, 730 overlap in coverage of nozzle locations. As discussed, some examples may align two or more digital images based at least in part on image overlap. As shown, the calibration output includes saturation ramps that are based on saturation ramps of a calibration image. While the pixel values of an input calibration image may be equal across each bar of a saturation ramp for a given saturation value, as shown in FIGS. 8A and 8B, due to variances in a printhead, printing material saturation may vary in the printed calibration output.

FIGS. 9A-C provide example charts of location saturation values for nozzle locations (i.e., X=0 to X=6000) that may be determined from analysis of a digital image comprising calibration output, such as the digital images 720, 730 of FIGS. 8A-B. FIG. 9A provides a chart 800 of example saturation values determined for a plurality of saturation ramps of a calibration output. As may be seen in FIG. 9A, two areas of the digital images corresponding to two segments of nozzle locations 802, 804, in particular, appear to have variances in saturation value as compared to expected values (i.e., input pixel values of a calibration image) as well as neighboring nozzle locations. FIG. 9B provides the example chart 800 of saturation values for nozzle locations as shown in FIG. 9A, and FIG. 9B further includes example preliminary segments 822 corresponding to nozzle locations. In FIG. 9C, some of the preliminary segments 822 of FIG. 9B have been combined, such that the nozzle locations have been divided into segments 824. FIGS. 9B and C illustrate example segments corresponding to one or more printheads by way of the location saturation values determined for nozzle locations of the one or more printheads.

As will be appreciated, the examples of FIGS. 9B and C illustrate that preliminary segments and segments may be variable in width, where the size of a particular segment (which is generally the width of the particular segment) is based on location saturation values. Therefore, in some examples, a first segment one or more printheads may have a first size and a second segment of the one or more printheads may have a second size, where the first size and the second size may be different. Generally, such variable width segmentation may reduce processing resource utilization associated with calculating uniformity correction values and/or adjustment of print content with such uniformity correction values. By segmenting one or more printheads (and the respective nozzle locations) based on location saturation values as compared to, for example, fixed nozzle locations, examples may thereby implement a dynamic and processing resource efficient calibration process. Moreover, such variable width segmentation may reduce memory resource usage by reducing an amount of uniformity correction values to store.

FIG. 10 provides an example calibration image that has been adjusted based at least in part on example uniformity correction values determined based on the example digital images 720, 730 of FIGS. 8A and B. Generally, adjustment of print content with a uniformity correction value may not be easily discernable to visual inspection; however, in this example, due to the variation noted in printhead areas 802, 804 of FIG. 9A, noticeable adjustments of pixel values in corresponding areas 902, 094 are illustrated in the example adjusted calibration image 900 of FIG. 10. FIGS. 11A and B provide example digital images of calibration output generated by printing the calibration image 900 of FIG. 10 with the example printing device used to generate the calibration output of digital images 720, 730 of FIGS. 8A and B. FIG. 12 provides an example chart 1000 that includes example saturation values determined from analysis of the digital images 920, 930 of FIGS. 11A and B. As shown, the saturation values appear more uniform as compared to the example saturation values in FIGS. 9A-C.

Therefore, examples described herein generally calibrate saturation of printing material (e.g., ink, toner, dyes, etc.) in the printing of print content. Furthermore, some examples may reduce printing material usage by calibrating a printing device to thereby match print saturation to a lowest saturation segment of the prinking device. In other examples, printing material usage may be increased to thereby improve visual characteristics of printed content by calibrating a printing device to a highest saturation segment of the printing device. In addition, examples may reduce processing and/or memory resource usage associated with printing device saturation calibration by implementing variable width segmentation of printheads and determining uniformity correction values for segments of one or more printheads.

While various examples are described herein, elements and/or combinations of elements may be combined and/or removed for various examples contemplated hereby. For example, the example operations provided herein in the flowcharts of FIGS. 3-6 may be performed sequentially, concurrently, or in a different order. Moreover, some example operations of the flowcharts may be added to other flowcharts, and/or some example operations may be removed from flowcharts. Furthermore, in some examples, various components of the example computing devices of FIGS. 1 and 2 may be removed, and/or other components may be added. Similarly, in some examples various instructions of the example memories and/or machine-readable storage mediums (such as the machine-readable storage medium of FIG. 1 and/or the memory resource 220 of FIG.

2) may be removed, and/or other instructions may be added (such as instructions corresponding to the example operations of FIGS. 3-6).

The preceding description has been presented to illustrate and describe examples of the principles described. This description is not intended to be exhaustive or to limit examples to any precise form disclosed. Many modifications and variations are possible in light of this description.

The invention claimed is:

1. A non-transitory machine-readable storage medium comprising instructions for execution by a processing resource of a printing device to cause a printing device to:
   analyze at least one digital image corresponding to a calibration output of a printing device to determine a location saturation value for each of a plurality of nozzle locations of the printing device;
   segment at least one printhead into a plurality of segments corresponding to one or more nozzle locations based at least in part on the location saturation value for each nozzle location;
   determine, from the plurality of segments, a reference segment; and
   determine, for each segment, a uniformity correction value based at least in part on the reference segment.

2. The non-transitory machine-readable storage medium of claim 1, wherein the printing device is configured to print in a plurality of primary colors, the at least one digital image comprises a cross-printing width saturation ramp for each primary color of the plurality, and the saturation value for each nozzle location of the plurality is determined based at least in part on a primary color saturation value for each nozzle location.

3. The non-transitory machine-readable storage medium of claim 1, further comprising instructions to cause the printing device to:
   adjust print content of the printing device with the uniformity correction value for each segment.

4. The non-transitory machine-readable storage medium of claim 1, further comprising instructions to cause the printing device to:
   store the uniformity correction value for each segment in a memory resource associated with the processing resource.

5. The non-transitory machine-readable storage medium of claim 1, wherein the at least one digital image comprises a plurality of digital images, and the machine-readable storage medium further comprises instructions to cause the printing device to:
   align each digital image of the plurality based at least in part on image overlap prior to analysis of the plurality of digital images to determine the location saturation value for each nozzle location.

6. The non-transitory machine-readable storage medium of claim 1, wherein the instructions to determine the reference segment comprise instructions to cause the printing device to:
   determine the reference segment to be a particular segment of the plurality based at least in part on a size of each segment of the plurality.

7. The non-transitory machine-readable storage medium of claim 1, wherein the instructions to determine the reference segment comprise instructions to cause the printing device to:
   determine the reference segment to be a particular segment of the plurality based at least in part on a segment saturation value corresponding to each segment of the plurality.

8. The non-transitory machine-readable storage medium of claim 7, wherein the instructions to determine the reference segment comprise instructions to cause the printing device to:
   determine whether to use additional printing material;
   wherein the reference segment is determined to be the particular segment based at least in part on the determination to use additional printing material.

9. The non-transitory machine readable storage medium of claim 1, wherein the reference segment is determined based at least in part on incoming print content, user input data, an associated print speed, a size of each segment of the plurality, an average saturation value for the printing device, a segment saturation value corresponding to each segment of the plurality, or any combination thereof.

10. The non-transitory machine readable storage medium of claim 1, wherein the instructions to segment the at least one printhead into the plurality of segments comprises instructions to cause the printing device to:
    segment the at least one printhead into a plurality of preliminary segments that each correspond to one or more nozzle locations based at least in part on the location saturation value for each nozzle location; and
    combine at least two preliminary segments of the plurality of preliminary segments into a particular segment of the plurality of segments.

11. A printing device comprising:
    at least one printhead for printing content on a physical medium, the at least one printhead having a plurality of nozzle locations;
    an imaging device;
    an analyze engine to analyze at least one digital image corresponding to a calibration output of the printing device received from the imaging device to determine a location saturation value for each of the plurality of nozzle locations of the printing device;
    a segment engine to segment the at least one printhead into a plurality of segments of approximately uniform saturation that each correspond to one or more nozzle locations based at least in part on the location saturation value for each nozzle location;
    a reference segment engine to determine, from the plurality of segments, a reference segment; and
    a uniformity correction value engine to determine a uniformity correction value for each segment based at least in part on the reference segment.

12. The printing device of claim 11, further comprising:
    a correction engine to adjust print content for the printing device based on the uniformity correction value for each segment; and
    a print engine to print the print content after adjustment by the correction engine.

13. The printing device of claim 11, further comprising:
    a calibration engine to generate the calibration output with the at least one printhead on a physical medium and to capture the at least one digital image of the calibration output with the imaging device.

14. A method for a printing device comprising:
    receiving at least one digital image from an imaging device that corresponds to a calibration output for a printing device comprising at least one printhead having a plurality of nozzle locations;
    analyzing, with a processing resource, the at least one digital image to determine a grayscale value for each nozzle location;
    segmenting the at least one printhead into a plurality of segments that each correspond to one or more nozzle locations based at least in part on the grayscale value of each nozzle location such that each segment of the plurality corresponds one or more contiguous nozzle locations that each have a respective grayscale value within a predefined difference range;

determining, from the plurality of segments, a reference segment; and determining, for each segment, a uniformity correction value based at least in part on the reference segment.

15. The method of claim 14, wherein the plurality of segments comprise a first segment having a first size corresponding to a first number of nozzle locations, and the plurality of segments comprise a second segment having a second size corresponding to a second number of nozzle locations, and the second size is different than the first size.

* * * * *

UNITED STATES PATENT AND TRADEMARK OFFICE
CERTIFICATE OF CORRECTION

PATENT NO. : 10,124,598 B2
APPLICATION NO. : 15/569307
DATED : November 13, 2018
INVENTOR(S) : Joe W Stellbrink et al.

It is certified that error appears in the above-identified patent and that said Letters Patent is hereby corrected as shown below:

In the Claims

In Column 16, Claim 9, Line 9, delete "machine readable" and insert -- machine-readable --, therefor.

In Column 16, Claim 10, Line 16, delete "machine readable" and insert -- machine-readable --, therefor.

Signed and Sealed this
Sixteenth Day of April, 2019

Andrei Iancu
*Director of the United States Patent and Trademark Office*